United States Patent [19]

Chaunce et al.

[11] 4,252,549

[45] Feb. 24, 1981

[54] CRYSTALLIZATION VIA POROUS TUBE HEAT TRANSFER

[75] Inventors: Richard W. Chaunce, West Chester, Pa.; Thomas J. McGinley, Wilmington, Del.

[73] Assignee: Suntech, Inc., Philadelphia, Pa.

[21] Appl. No.: 44,292

[22] Filed: May 31, 1979

[51] Int. Cl.³ .............................................. B01D 9/24
[52] U.S. Cl. ...................................... 62/532; 62/533; 62/80; 62/123; 208/37
[58] Field of Search .................. 62/532, 533, 536, 81, 62/82, 80, 123, 124; 208/37; 210/321 R

[56] References Cited

U.S. PATENT DOCUMENTS

| 2,137,373 | 11/1938 | Williams, Jr. | 208/37 |
| 2,224,109 | 12/1940 | Stearns | 208/37 |
| 3,702,658 | 11/1972 | McNamara et al. | 210/321 R |
| 3,846,279 | 11/1974 | Merrill, Jr. | 208/37 |
| 3,922,220 | 11/1975 | Middleman et al. | 210/321 R |

*Primary Examiner*—Norman Yudkoff
*Attorney, Agent, or Firm*—J. Edward Hess; Donald R. Johnson; Paul Lipsitz

[57] ABSTRACT

In crystallization units such as wax crystallization units where a scraped surface double pipe heat exchanger type chiller is used, the improvement of replacing the scraped surface chiller tube with a porous tube to provide positive flow of coolant through the tube wall to prevent crystal deposition on the process side of the tube, whereby crystal degradation is eliminated and increased filter rate is obtained.

7 Claims, 5 Drawing Figures

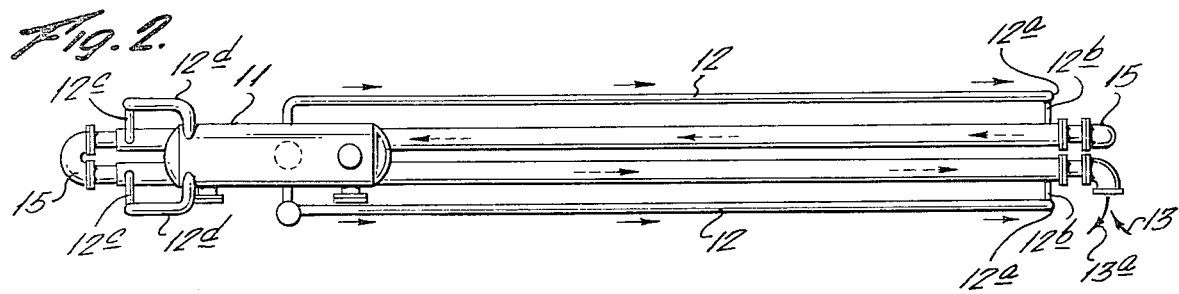

CRYSTALLIZATION VIA POROUS TUBE HEAT TRANSFER

Wax crystallization processes are well known in the art and the most common systems employ scraped surface double pipe (e.g. concentric tubes) heat exchangers to crystallize the wax from a wax-oil-solvent mixture. In such systems crystal degradation of the crystallized wax frequently occurs due to the shearing action of the scrapers. This, in turn, adversely affects the filtration rate on filters downstream of the crystallizer because of filter plugging by the smaller, degraded crystals. A similar problem is present also in the crystallization of other materials where similar equipment is used (e.g. p-xylene crystallization).

A novel technique and apparatus has now been found to remedy such crystallization problems wherein a scraper no longer is employed. In accord with the invention which is illustrated by reference to wax crystallization, a process for crystallization of wax from a solvent is provided by chilling a wax-oil-solvent solution flowing through a heat exchanger of the double pipe type or a shell and tube bundle type comprising a conduit which is porous to the chilling fluid surrounding the conduit and wherein the chilling fluid is maintained at a positive pressure sufficient to force it through the conduit, whereby when the wax crystallizes from the wax-oil-solvent solution it does not adhere to the wall of the conduit and wax crystal degradation is avoided.

With reference to the drawings:

FIG. 1 is a schematic side elevational view of a 12 section chilling unit (e.g. crystallizer) utilizing the porous tube of the invention.

FIG. 2 is a schematic plan view of the 12 section chilling unit shown in FIG. 1.

FIG. 3 is a sectional plan view, taken on the line 3—3 of FIG. 1 showing the installation of the porous tubing of the invention.

FIG. 4 is an enlarged transverse sectional view through a heat transfer tube, taken on the line 4—4 of FIG. 3.

FIG. 5 is a greatly enlarged fragmentary sectional view of the details enclosed by the dot and dash box of FIG. 4.

In FIG. 1, the flow of refrigerant through the heat exchange tubes is shown. The liquid refrigerant flows from a storage tank 11 through line 12 and header 12a to enter the shell side of the heat exchanger through lines 12b and exit the heat exchanger through lines 12c (see FIG. 3). The solvent solution of wax and oil enters the system at 13 (FIGS. 1 and 3), flows through the porous tubes 14 within the shells, being conducted from tube to tube by means of elbows 15, and exits from the system at 13a. The refrigerant is conducted through headers 12 as stated and exits the system at 12d (FIG. 1) usually in the vapor state as it returns to the storage tank 11.

Referring now to FIG. 4, the chilling liquid 16 circulates through shell 17 and effects precipitation of wax 18 from wax-oil-solvent solution 19 which flows within porous tube 14. As seen in more detail in FIG. 5, as the refrigerant liquid 16 seeps through porous tube 14, it forms a fluid layer 20 (liquid or gas depending on the refrigerant and temperature) adjacent the inside wall of the porous tube and this fluid layer 20 serves to prevent wax particles 18 from adhering to the tube's surface. Thus, the wax is effectively removed from solution without wax build-up.

The porous conduit used in the apparatus will have, preferably, as shown, a circular cross-section and be concentric with an outer conduit also preferably of circular cross-section, although, of course, conduits of other cross-section configurations may be used. The inside porous conduit may be made of any of numerous materials and a preferred material will be a sintered metal, which materials are made by the techniques of powder metallurgy and are known to have porosity for vapor and liquids (see for example the Kirk-Othmer "Encyclopedia of Chemical Technology", Vol. 1b, pages 401–402, 415–418, and 425–426). Typical sintered metals useful are sintered brass, bronze, iron, copper, stainless steel and the like and are commercially available. Sintered stainless steel is a preferred material as it is easier to handle in constructing the heat exchanger for the system; e.g. it is readily welded and therefore the unit can be constructed without the need for gaskets which tend to leak. Other preferred materials are laminated alloys having microscopic holes such as "Lamilloy" which is a product of General Motors corporation. Other useful materials include ceramic materials (e.g. a porous alumina, porous graphite, and the like. The chilling liquid flowing through the porous conduit may be a refrigerant or even chilled solvent. If the chilling liquid is a refrigerant, a material such as propane, liquid ammonia or other conventional refrigerant will be used. As the refrigerant passes through the porous conduit wall it vaporizes to some extent and provides a vapor film adjacent the outer wall of the porous conduit, thus preventing precipitated wax from adhering to the wall. In the event that vaporization does not occur, or to the extent that it is incomplete, a liquid film is formed along the external wall of the conduit. Similarly, if a solvent material such as acetone, methylethylketone, methylisobutylketone, or other typical ketone or other solvent is used as chilling fluid, the liquid passes through the porous conduit and forms a fluid film on the wall surface to prevent wax adherence.

As indicated the chilling liquid is under sufficient positive pressure to force it through the wall of the porous conduit. The pressure need not be very great, only sufficient to provide a film of the refrigerant or its vapor on the inside wall of the conduit. Usually the pressure differential of the chilling liquid will be on the order of about 5 to about 50 psig, preferably about 20 psig, the actual pressure difference depending, of course, on the specific type of conduit and chilling liquid used. In order to achieve and maintain this pressure it may be helpful to provide one or more pumps in the lines through which refrigerant passes (not shown on drawings).

As the wax crystallizes from its solvent solution a wax-oil-solvent slurry is formed which is readily filtered by means of conventional filtration equipment to separate the wax crystals. This wax, either as slack wax or deoiled wax, as it is known in the art, is, of course, subsequently handled in the usual manner (typically filtration or centrifugation) to obtain the desired wax product. The filtrate from the wax filtration will, of course, contain both the wax solvent and the chilling liquid and these components are readily separated by conventional techniques (e.g. distillation) and recycled to the system. Also not shown in the drawings but of possible benefit to the system is a mixer (say of the screw or static type) concentric with the inner tubular conduit to effect mixing of the wax crystals in the wax-oil-solvent slurry and provide a thoroughly mixed system which is fed to the filters.

The invention claimed is:

1. In the process of crystallizing a material from a solvent solution by conducting said solution through a heat exchanger of the double pipe or shell and tube bundle type wherein a chilled liquid surrounds the solution flowing through a tube to crystallize said material, the improvement of constructing said tube of a material porous to said chilled liquid and maintaining said chilled liquid under a positive pressure, whereby said liquid flows through the walls of said tube and forms a fluid layer to prevent crystallized material from adhering to the surface of said tube.

2. In the process of crystallizing wax from a wax-oil-solvent solution by conducting said wax solution through a heat exchanger of the double pipe or shell and tube bundle type wherein a chilled liquid surrounds the wax solution flowing through a tube to precipitate said wax, the improvement of constructing said tube of a material porous to said chilled liquid and maintaining said chilled liquid under a positive pressure, whereby said liquid flows through the walls of said tube and forms a fluid layer to prevent precipitated wax from adhering to the surface of said tube.

3. The process of claim 2 wherein the heat exchanger is of the double pipe type.

4. The process of claim 2 wherein the heat exchanger is of the shell and tube bundle type.

5. The process of claim 2 wherein the porous tube is made from a sintered metal.

6. The process of claim 5 wherein the porous tube is made of stainless steel.

7. The process of claim 5 wherein the porous tube is made of a ceramic material.

* * * * *